United States Patent [19]

Jensen

[11] Patent Number: 5,681,010
[45] Date of Patent: Oct. 28, 1997

[54] INFLATABLE DEPLOYABLE CONTROL STRUCTURES FOR AEROSPACE VEHICLES

[75] Inventor: Duane Lowell Jensen, Byron, Calif.

[73] Assignee: Lockheed Missiles & Space Co., Inc., Sunnyvale, Calif.

[21] Appl. No.: 542,925

[22] Filed: Oct. 13, 1995

[51] Int. Cl.$^6$ .................................................. B64C 3/56
[52] U.S. Cl. ..................... 244/49; 244/117 R; 244/100 A
[58] Field of Search .................... 244/87, 218, 117 R, 244/49, 100 A, 219 A; 52/2.11, 2.23, 2.22

[56] References Cited

U.S. PATENT DOCUMENTS

| | | | |
|---|---|---|---|
| 2,851,229 | 9/1958 | Clark | 244/219 A |
| 2,937,826 | 5/1960 | Johnson | 244/219 A |
| 3,106,373 | 10/1963 | Bain et al. | 244/117 R |
| 3,136,501 | 6/1964 | Barber | 244/219 A |
| 3,463,420 | 8/1969 | Butler et al. | 244/218 |
| 4,024,679 | 5/1977 | Rain et al. | 52/2.23 |

*Primary Examiner*—Andres Kashnikow
*Assistant Examiner*—Tien Dinh
*Attorney, Agent, or Firm*—Feix & Feix; Henry Groth

[57] ABSTRACT

The invention discloses a deployable, inflatable aerodynamic control structure for aerospace vehicles which has a desired noncircular or noncylindrical cross-section and fabrication methods therefor. In a preferred embodiment, the control structure is configured as an inflatable airfoil and includes a flexible skin and a plurality of internally disposed airfoil-shaped bulkheads or integral rib members that are arranged, spaced apart, in cross-wise fashion along the axial length of the airfoil shaped control structure. The flexible skin is fabricated as a lay up, in ordered sequence, of plural layers of elastomeric rubber material and plural ply layers of resin-impregnated yarns or fabric. The result is a fiber-reinforced pressure membrane that is flexible and compactly foldable. Rib-to-skin cloth attachments are provided to secure the airfoil-shaped integral rib members to the flexible skin whereby one end of each rib-to-skin cloth attachment penetrates the flexible skin being cured in place between elastomeric layers of the filament-reinforced pressure membrane to provide a seamless airtight sealed connection. The number and spacing of the integral rib members determine the amount of deviation from a perfect airfoil structure that is allowed, since the flexible skin will have a tendency to bulge outwardly at regions between adjacent airfoil-shaped integral rib members.

22 Claims, 11 Drawing Sheets

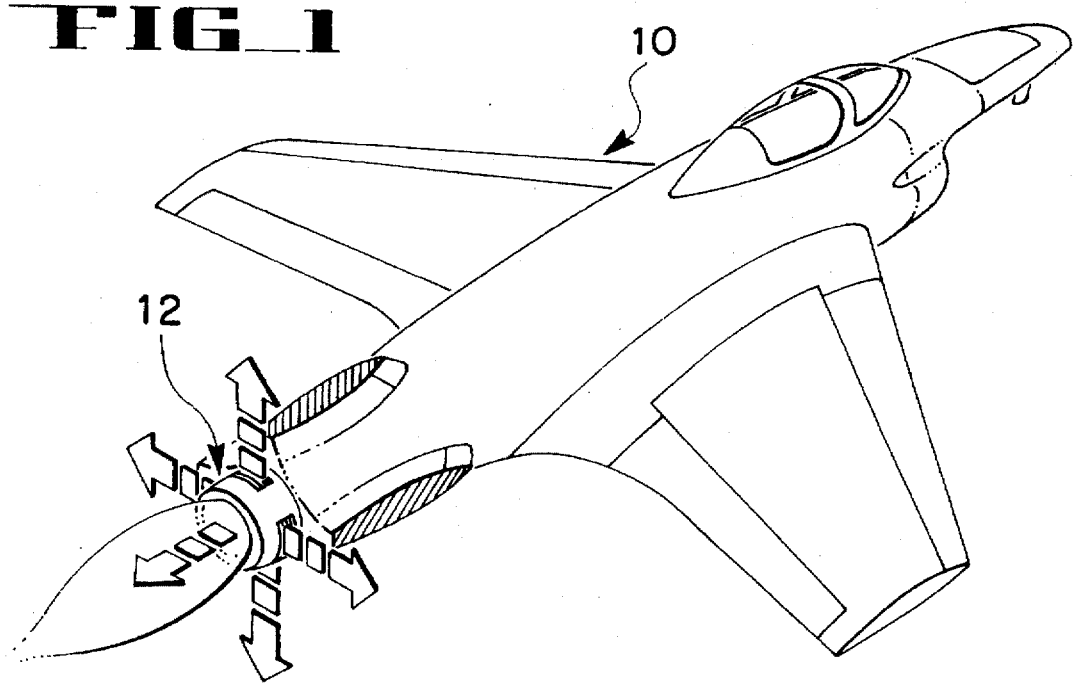
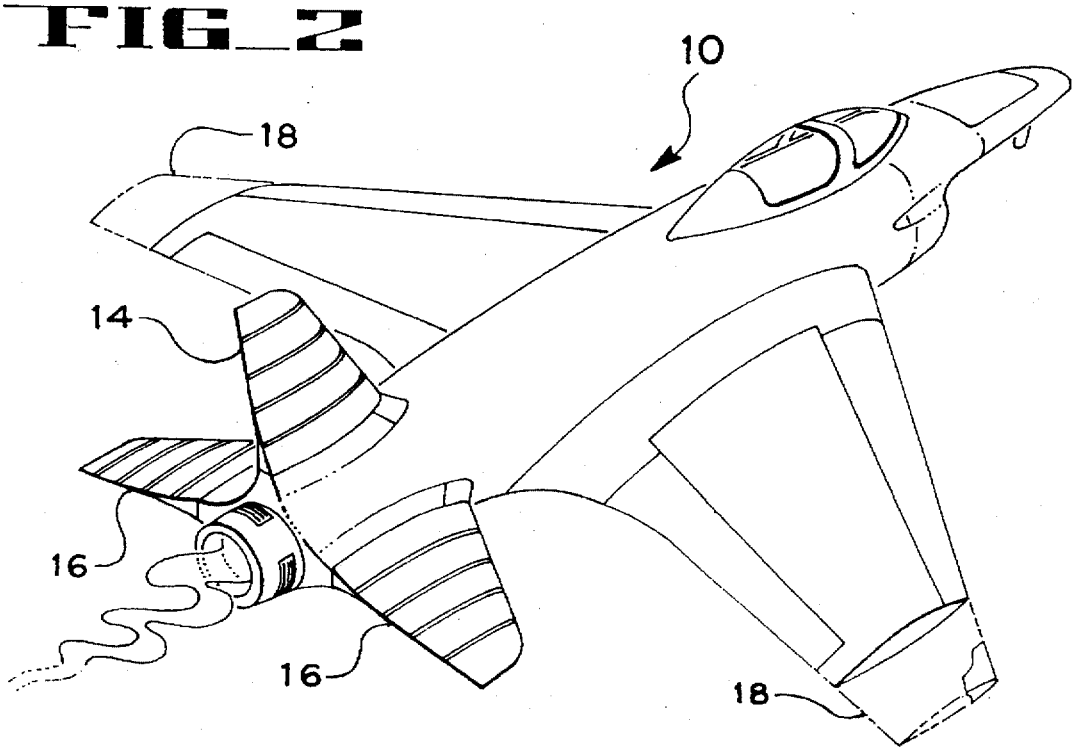

FIG_4
PRIOR ART
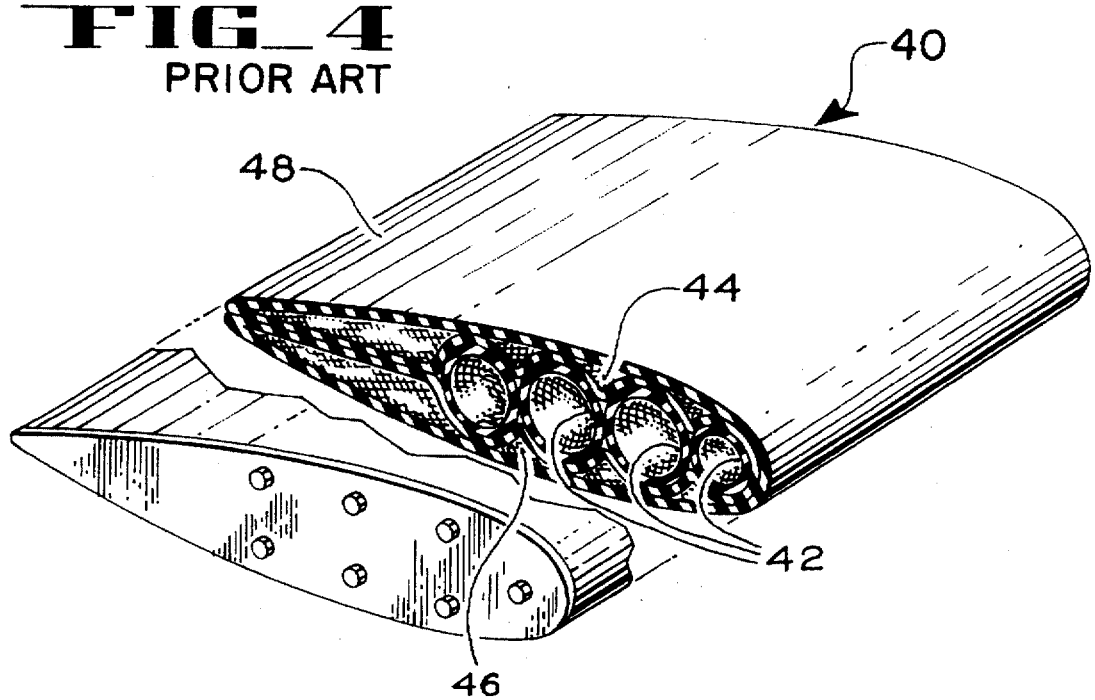
FIG_3
PRIOR ART
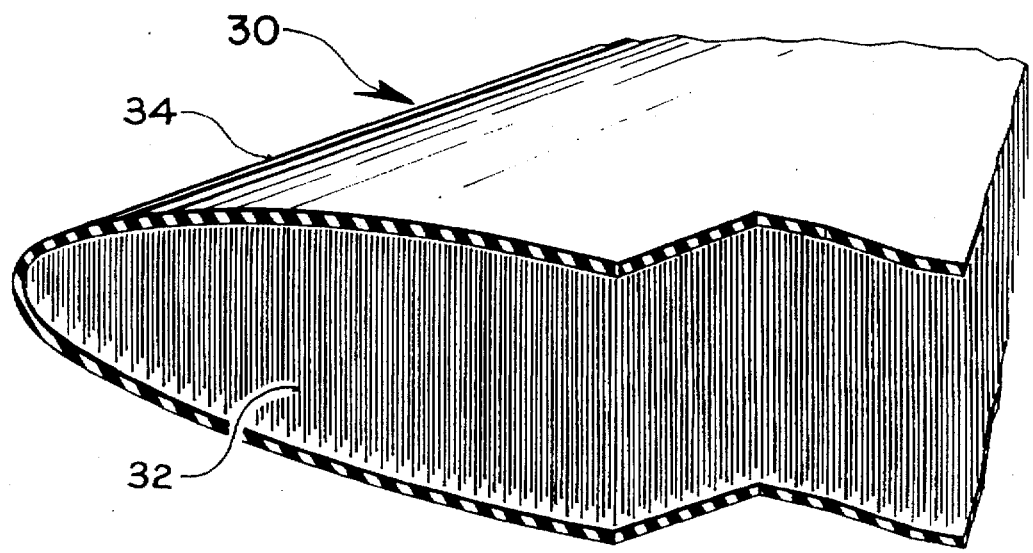

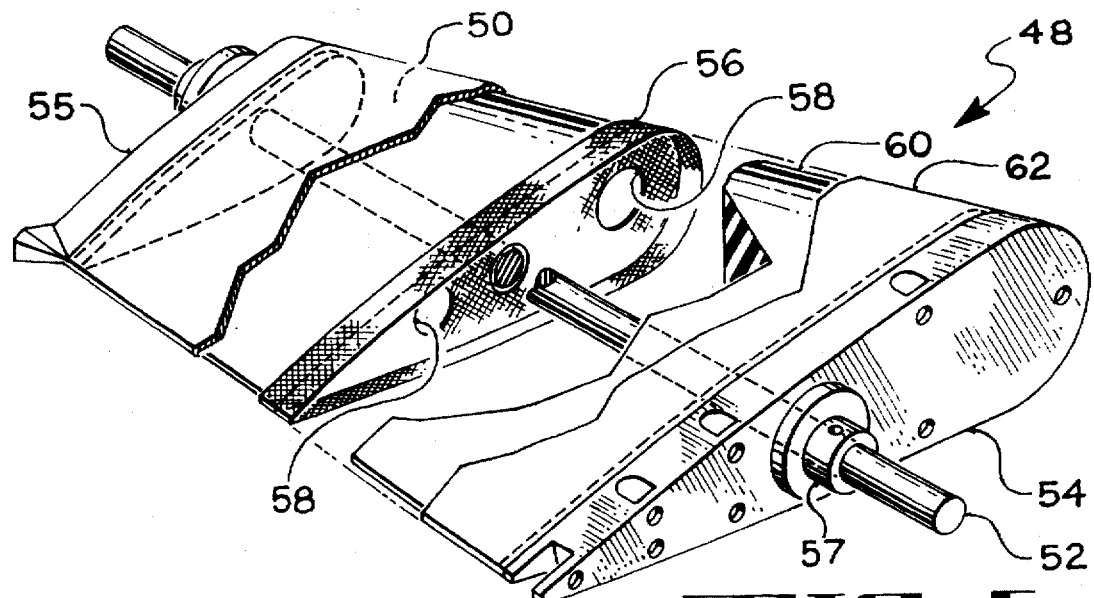
FIG_5
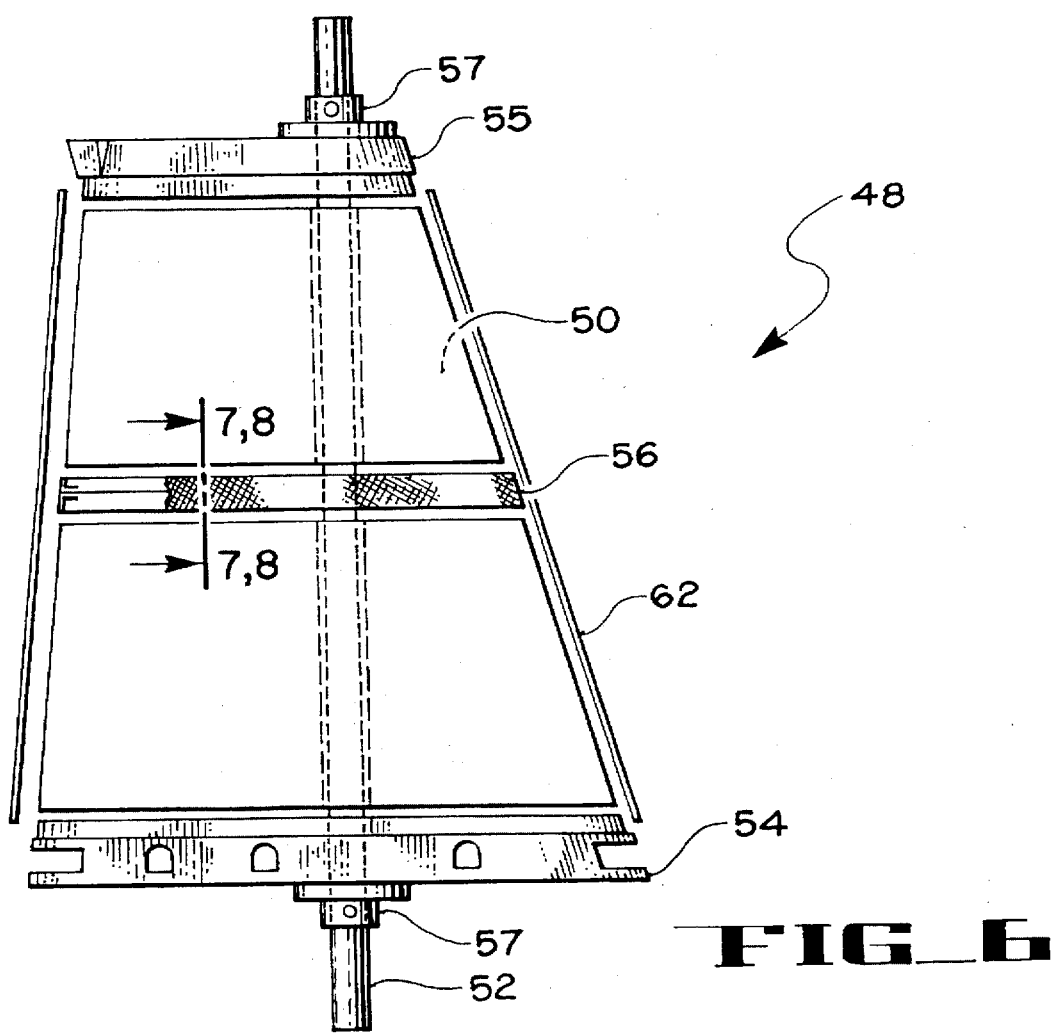
FIG_6

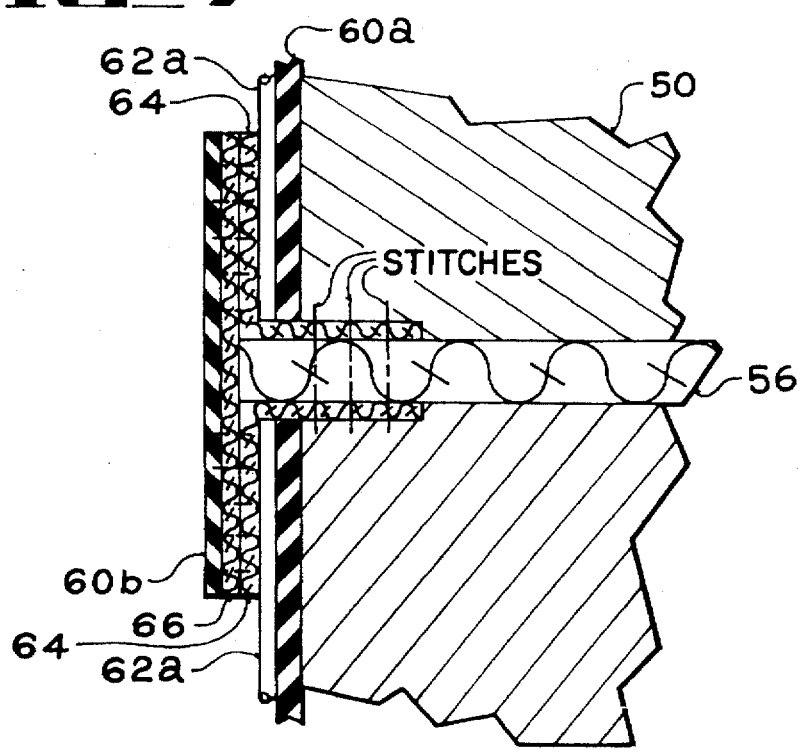
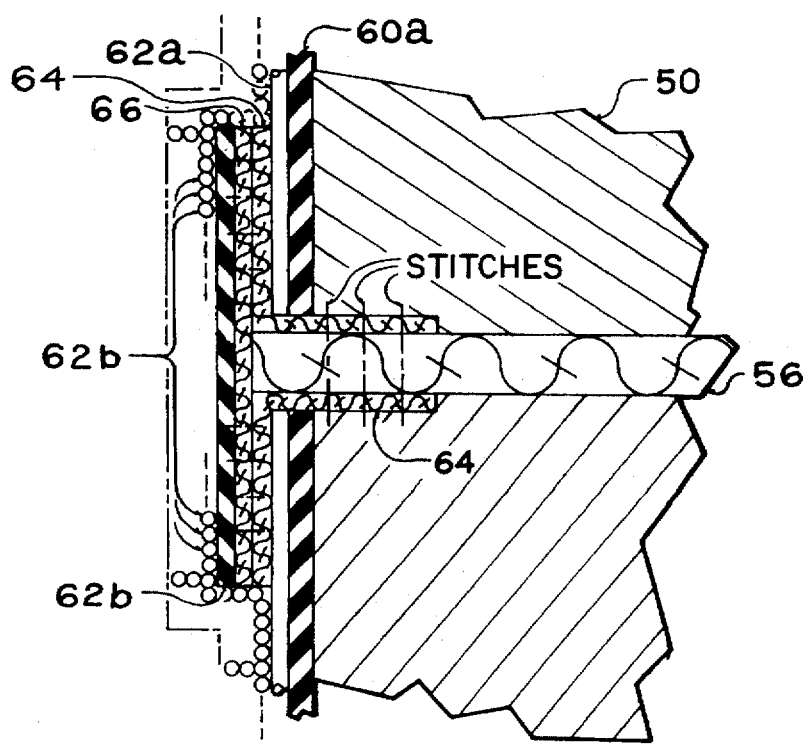

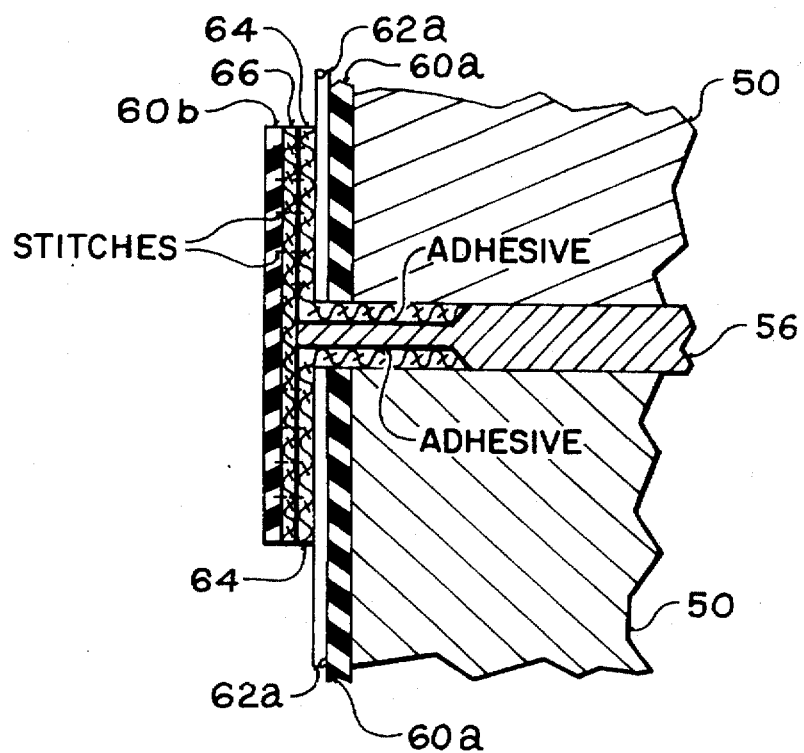
FIG_9
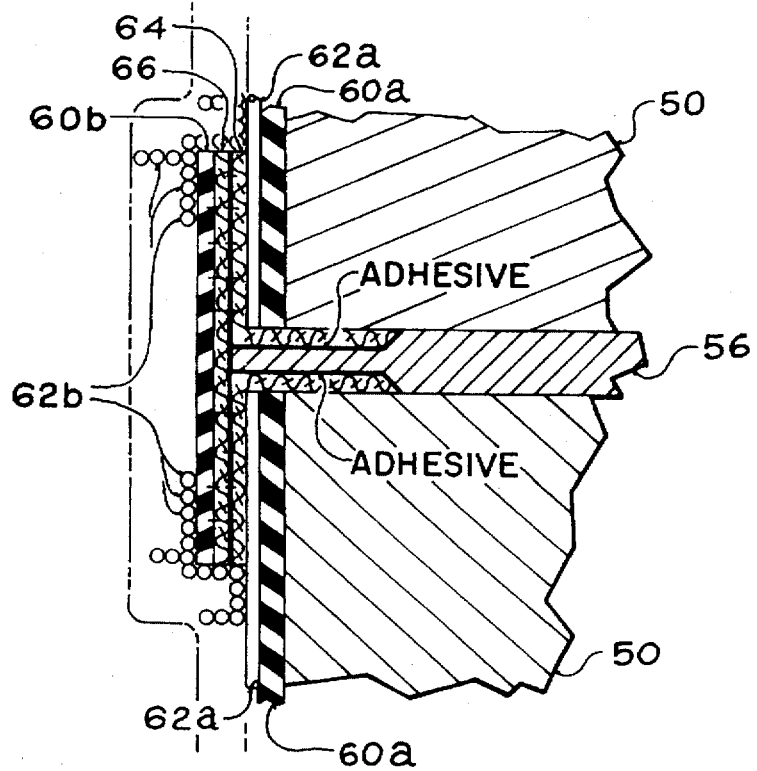
FIG_10

FIG_11
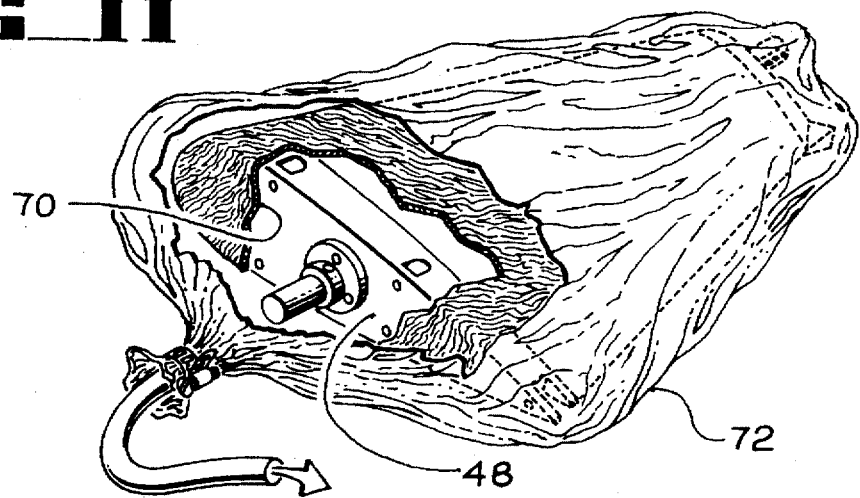
FIG_12
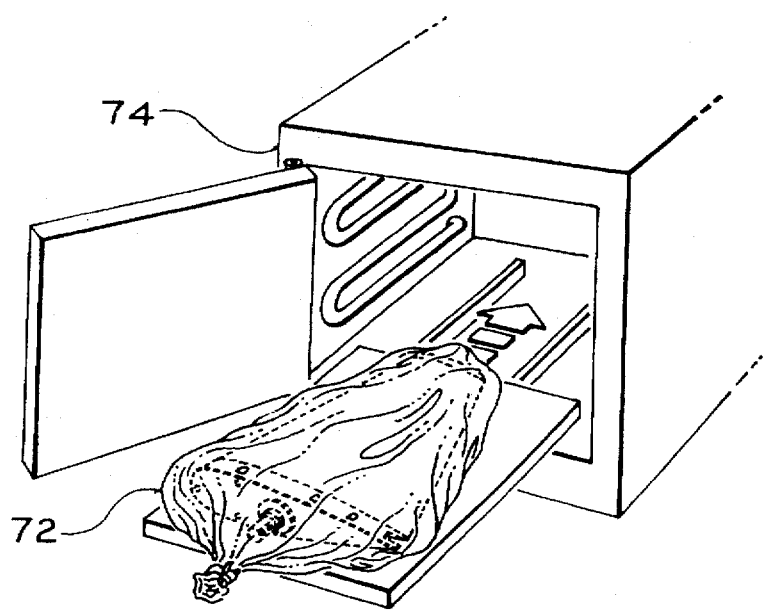
FIG_13
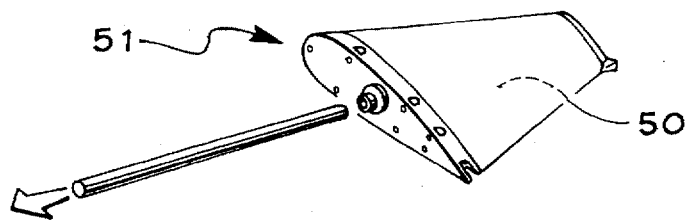

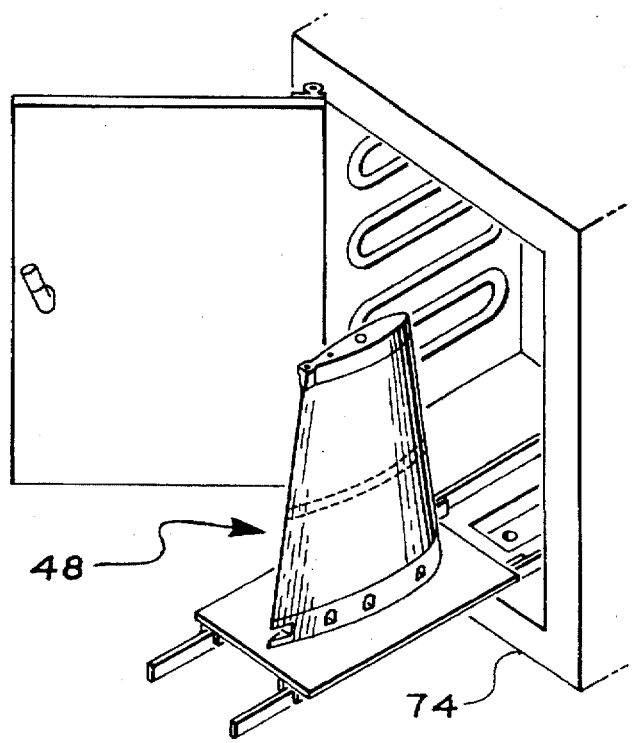
FIG_14
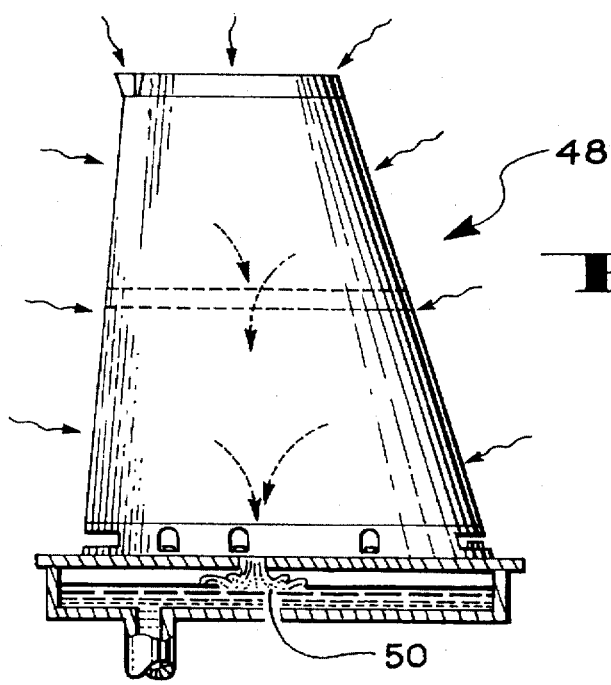
FIG_15
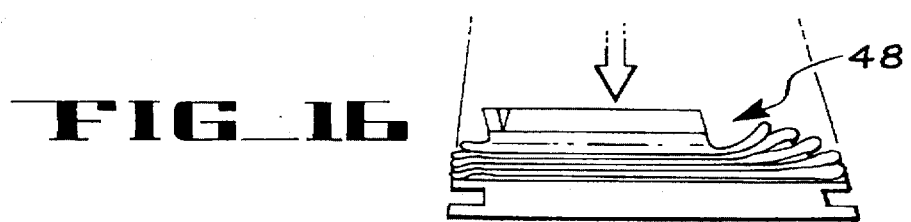
FIG_16

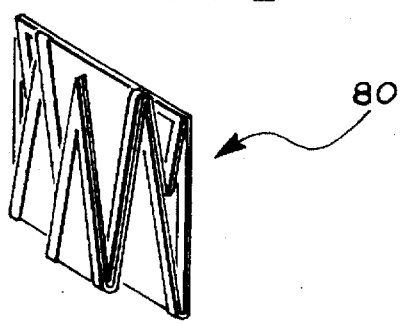
FIG_17
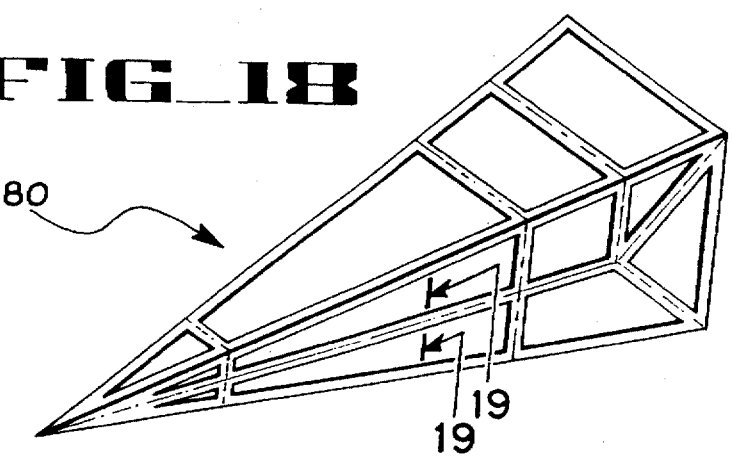
FIG_18
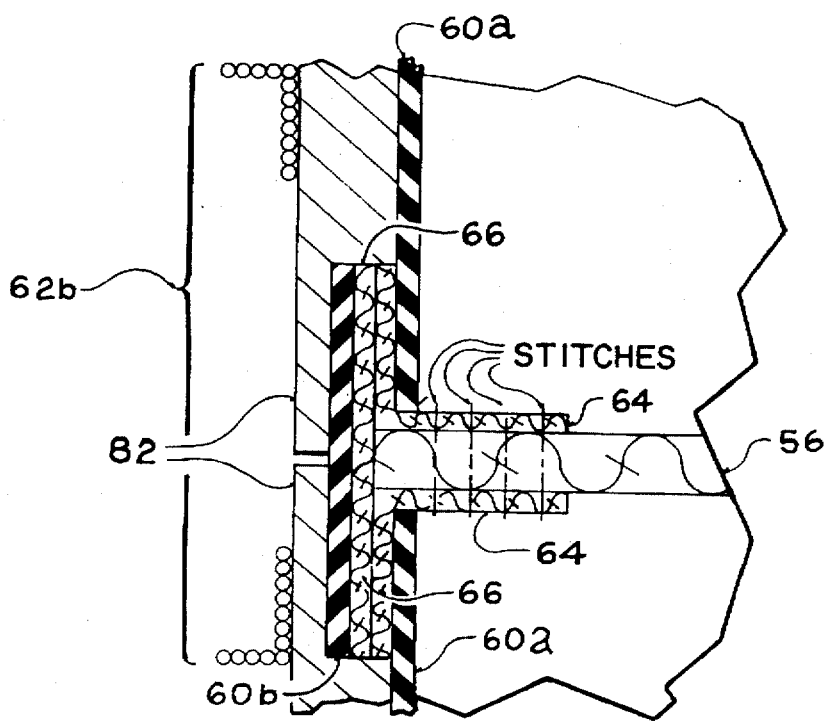
FIG_19

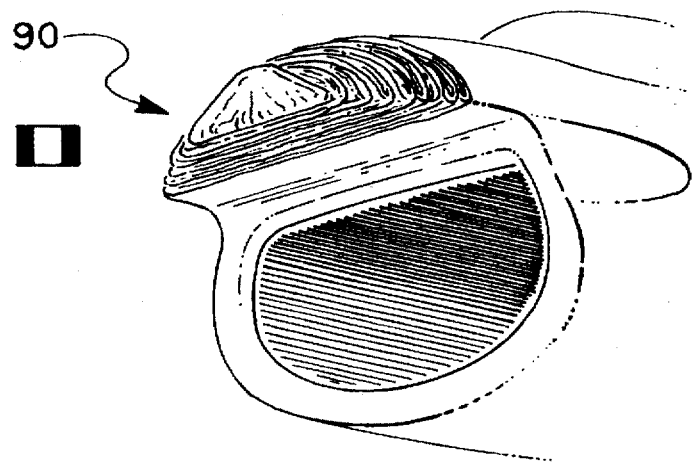
FIG_20
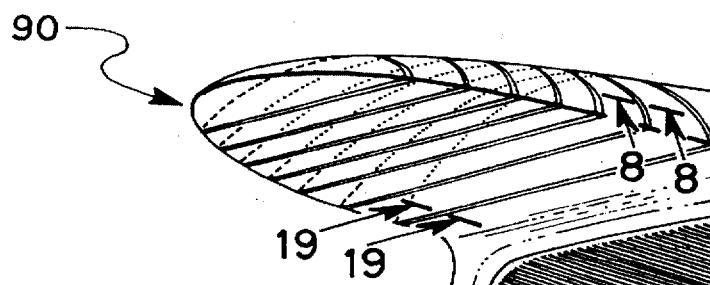
FIG_21
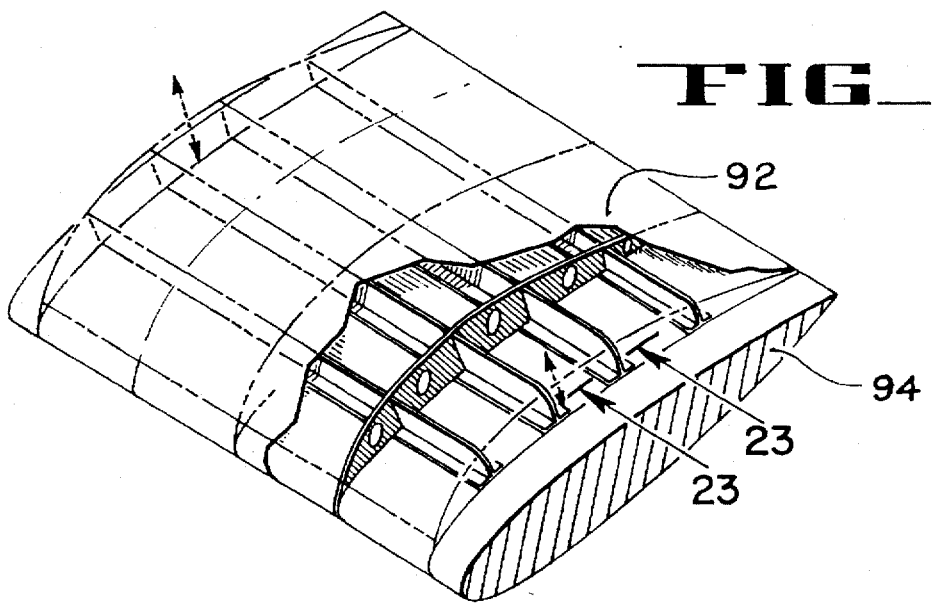
FIG_22

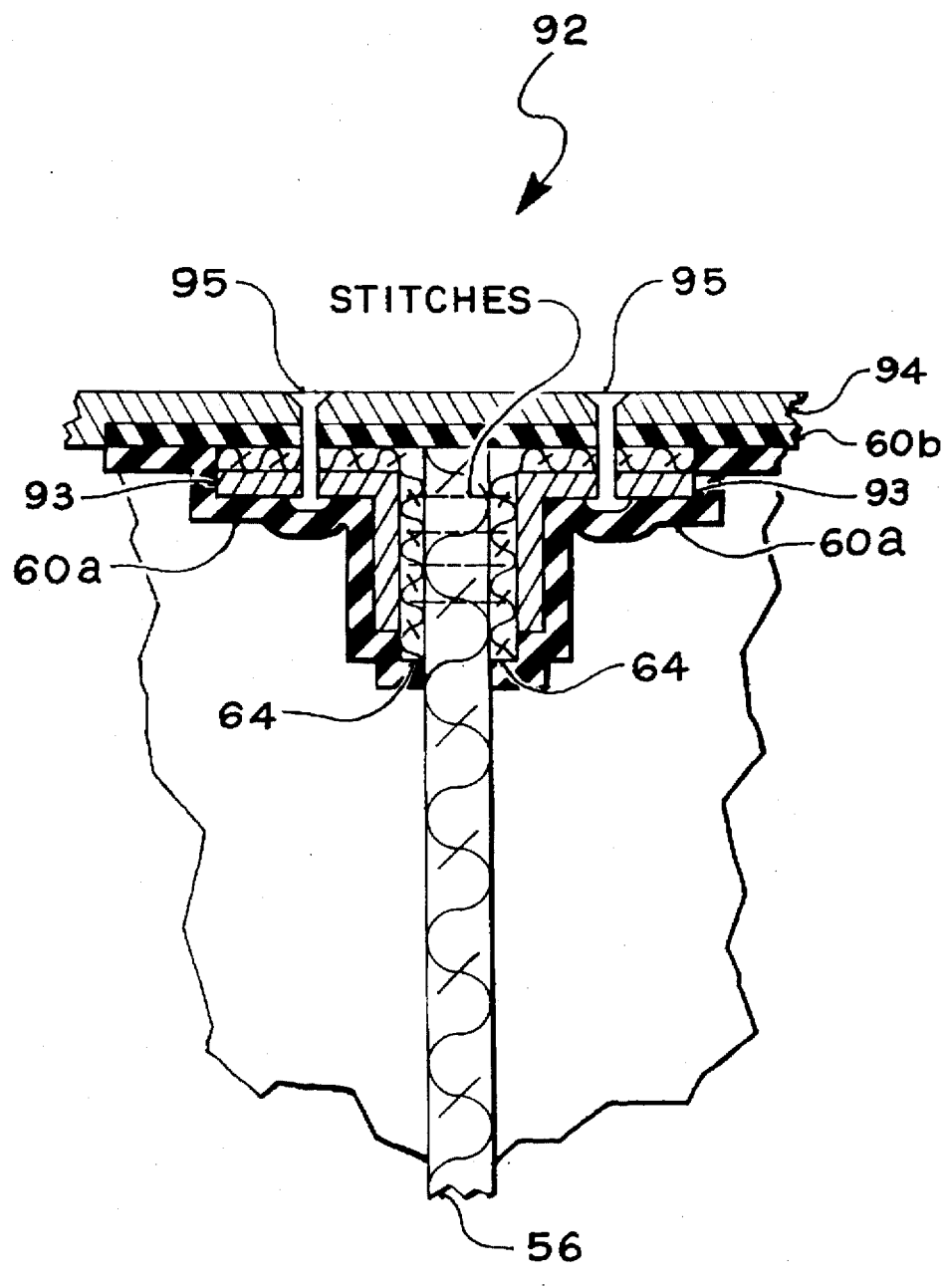

FIG_24
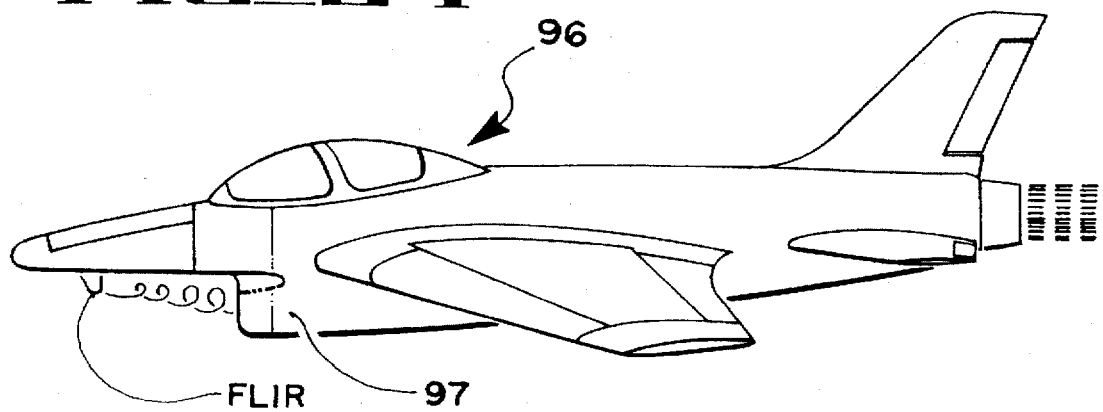
FIG_25
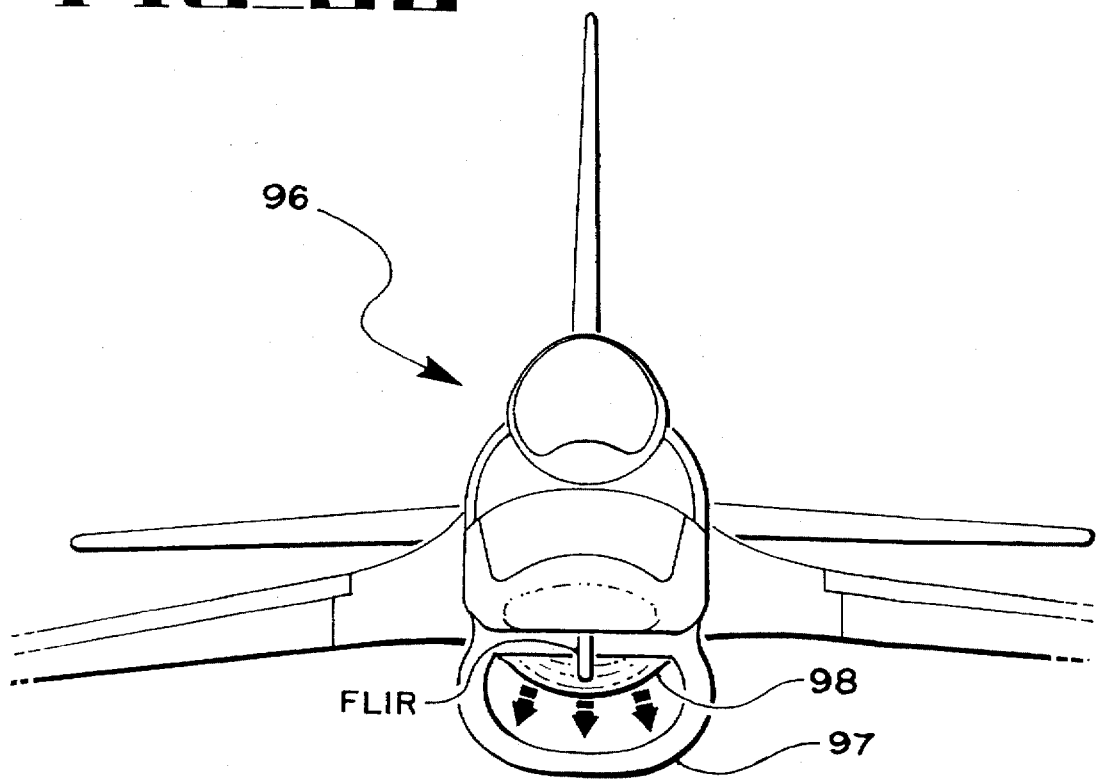

INFLATABLE DEPLOYABLE CONTROL STRUCTURES FOR AEROSPACE VEHICLES

CROSS REFERENCES TO RELATED U.S. APPLICATIONS

The co-pending application Ser. No. 08/249,847 filed May 26, 1994 and entitled "Inflatable Nose Fairing", Duane Lowell Jensen and Rolla William Allen inventors, is incorporated by reference in this application.

The co-pending application Ser. No. 08/250,042 filed May 27, 1994 and entitled "Fabrication Method For Inflatable Nose Fairing", Duane Lowell Jensen; Takashi Aochi; Rendall W. Cothern; Philip Kent Shelton inventors, is also incorporated by reference in this application.

TECHNICAL FIELD

The present invention relates to inflatable, deployable, or expandable control structures for aerospace vehicles that have non-circular and/or non-cylindrical cross-sectional shapes, such as, for example, aircraft and missiles. More particularly, the present invention relates to a method for fabricating an inflatable airfoil control structure which includes a plurality of internal bulkheads or integral rib members of defined airfoil cross-sectional shape that are attached to the inner surface of an inflatable skin that is formed as a flexible fiber-reinforced elastomeric pressure membrane.

BACKGROUND OF THE INVENTION

Recent flight tests of research aircraft, such as the X-31 enhanced fighter maneuverability test bed, the F-16 Multi-Axis Thrust Vectoring (MATV) aircraft, the F-18 High Alpha Research Vehicle (HARV), and the F-15 Advanced Control Technology For Integrated Vehicles (ACTIVE), have demonstrated increased maneuverability by vectoring the exhaust from the aircraft's engine. These flight tests have demonstrated, by ballasting the aircraft to simulate the unstable effects of removing the tail surfaces, that indeed the aircraft can fly without tail surfaces, such as the vertical tail.

It is envisioned that the next generation of aircraft will employ thrust vectoring engines. An aircraft equipped with a thrust vectoring engine does not require vertical and horizontal tail stabilizers as long as the thrust vectoring engine continues to operate. In the case of military aircraft in particular, it would be desirable to remove the aircraft's vertical and/or horizontal tail surfaces as this would significantly reduce the radar cross-section signature of the aircraft.

However, in the event of a failure of the thrust vectoring engine, an aircraft without a vertical and/or horizontal tail surface becomes immediately uncontrollable. Accordingly, a backup deployable vertical and/or horizontal airfoil is needed to recover the stability of the aircraft.

It is well known in the art to provide a deployable airfoil structure in the form of a metal wing which deploys outwardly from the aircraft's fuselage as a folding or pivoting member. However, such metal airfoil structures are generally undesirable because they add an undesirable amount of weight to the aircraft.

An inflatable, deployable airfoil structure made from lightweight materials would be desirable as it would not add significant weight to the aircraft and it could also be compactly stowed within the aircraft's fuselage thereby conserving valuable storage space which could be advantageously used for other purposes.

Pressure vessels made from flexible material, such as a child's balloon, naturally conform to a circular cross-section when pressurized. They are usually spherical or cylindrical in geometry, but in both instances a cross-section through the balloon reveals circular cross-sections. Airfoils for aircraft and missiles typically have elongated tear shaped cross-sections which are far different from circular or cylindrical cross-sections. The problem, therefore, is how to design an inflatable airfoil structure using a flexible, airtight pressure membrane material which, when pressurized, conforms to a desired noncircular cross-section airfoil shape.

Lightweight inflatable structures for use as airfoils for aircraft are known from the prior art. With reference to FIG. 3, there is shown a well known design for an inflatable airfoil 30 whereby the cross-sectional shape of the airfoil is determined by a number of internal strings 32 of preselected lengths that are pre-stitched to the outer skin 34 of the airfoil 30. The strings 32 function as tension members which define the airfoil shape when the airfoil is pressurized. As is readily apparent, the fabrication of such an inflatable airfoil is labor intensive. In the past, such airfoils have been limited to flight applications which only require low inflation pressures, such as, for example, floats or dirigibles. A stringed inflatable airfoil as shown would not likely withstand the higher internal and external pressure demands associated with supersonic flight.

FIG. 4 shows an example of another prior art inflatable airfoil construction 40 that is commercially available through Fiber Innovations Inc. of Norwood, Mass. In this design, the inflatable airfoil 40 includes several internally disposed inflatable tube structures 42. The inflatable tube structures 42 are formed as individual cylindrical pressure membranes which are encased by a filament wound cross-braided reinforcement layer. The inflatable tube structures 42 are arranged in the lengthwise direction of the wing. Additional top and bottom fillets 44 and 46 are provided to fill the voids that exist between the inflatable tube structures 42 and the outer skin 48. The fabrication process for the inflatable airfoil 40 shown in FIG. 4 is very complex and costly. In addition, the compact stowage capability of this design in the lengthwise direction of the airfoil is limited by the compressibility of the fillet material and the relatively inflexible and torsionally stiff cross-braided filament wound reinforcement layer of the several inflatable tube structures 42.

Copending application Ser. Nos. 08/249,847 and 08/250,042, both of which are commonly owned by the assignee of this application, disclose an improved filament winding process for fabrication of an inflatable aerodynamic nose fairing of conical configuration. The conical shaped inflatable nose fairing exhibits excellent strength and flexibility characteristics and permits for compact folding in the axial direction.

It would be desirable to provide an inflatable control structure for aircraft having a desired airfoil cross-sectional shape and which also retains the improved flexibility and foldability characteristics of the conical shaped filament-wound pressure membrane disclosed in the above two copending applications.

SUMMARY OF THE INVENTION

It is therefore among the objects of the present invention to provide methods and apparatus for fabricating inflatable control structures for aircraft having desired noncircular or noncylindrical cross-sectional aerodynamic shapes and which over come the problems of the prior art.

A simple and low cost fabrication method for producing a flexible and compactly stowable inflatable airfoil of a desired airfoil cross-sectional shape constitutes a specific object of the present invention.

Briefly, in accordance with a preferred embodiment of the invention, an inflatable control structure for aircraft is constructed as an inflatable airfoil which includes a plurality of airfoil-shaped bulkheads (hereinafter referred to as "integral rib members") that are arranged, spaced apart, in order of descending size and internally disposed within a flexible skin. Rib-to-skin attachments are provided to secure the airfoil-shaped integral rib members to the flexible skin in an airtight manner. The number and spacing of the integral rib members determine the amount of deviation from a perfect airfoil structure that is allowed, since the flexible skin will have a tendency to bulge outwardly at regions between adjacent airfoil-shaped integral rib members.

The flexible skin is fabricated as a lay up, in ordered sequence, of plural layers of elastomeric rubber material and plural ply layers of resin-impregnated yarns or fabric. The result is a fiber-reinforced pressure membrane that is flexible and compactly foldable.

The airfoil-shaped integral rib members advantageously include one or more perforations which permit passage of inflation gasses therethrough and which also function to facilitate rapid and complete pressurization of the inflatable airfoil structure during deployment. In one embodiment, the integral rib members comprise flexible high strength cloth materials. In another embodiment, the integral rib members comprise rigid metallic materials.

Also disclosed is a method for attaching the airfoil-shaped integral rib members to the flexible skin in seamless fashion whereby the rib-to skin attachments actually penetrate the elastomeric pressure membrane layer of the flexible skin.

The inflatable airfoil of the present invention offers many advantage over conventional rigid metal deployable wing constructions including: significant weight savings, fewer components, simplicity in design and deployment, and reduced manufacturing costs.

Further, since the inflatable airfoil can be fabricated entirely from nonmetallic materials, the inflatable airfoil can be made transparent to radar, thereby keeping the radar cross-section signature of the aircraft as low as possible.

In another advantageous embodiment of the invention, rigid panels are incorporated within selected portions the flexible skin to provide flat-sided inflatable aerodynamic control structures for aircraft and missiles. A first example includes a semiconical missile nose fairing having a flat bottom. A second example includes a tetrahedronal missile nose fairing.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric perspective view of an aircraft equipped with a thrust vectoring engine and shown with its vertical and horizontal tail stabilizer removed.

FIG. 2 is an isometric perspective view similar to FIG. 1 showing the aircraft provided with several inflatable, deployable aircraft control structures constructed in accordance with preferred embodiments of the present invention FIG. 3 is a isometric perspective view illustrating a first inflatable airfoil design known from the prior art.

FIG. 4 is a isometric perspective view illustrating a second inflatable airfoil design known from the prior art.

FIG. 5 is an axialmetric view of an airfoil-shaped mandrel for use in fabricating a flexible filament-reinforced pressure membrane for providing an inflatable, deployable control structure for aerospace vehicles in accordance with the present invention. A filament-reinforced pressure membrane (shown in a partial breakaway view) is shown being formed over the mandrel.

FIG. 6 is a side elevation view of the mandrel and overlying filament-reinforced pressure membrane shown in FIG. 5.

FIGS. 7–8 show a two-part series of cross-section drawing views through the skin of the inflatable control structure taken along the line and in the direction of arrows 7,8–7,8 of FIG. 6. This two-part series of drawing views illustrates the fabrication sequence of the various layers of the inflatable filament-reinforced membrane structure and their attachment to a flexible integral rib member in airtight fashion.

FIGS. 9–10 is a two-part series of cross-section drawing views similar to FIGS. 7–8 but showing the integral rib member as a rigid metal member.

FIGS. 11–16 provide a tutorial depiction of the method steps involved with curing the completed filament reinforced pressure membrane and removing the mandrel tooling by a lost wax process.

FIGS. 17–18 show a deployable, inflatable aerodynamic control structure in the form of a tetrahedronal nose fairing constructed in accordance with another embodiment of the present invention, wherein: FIG. 17 shows the tetrahedronal nose fairing in a stowed position; and FIG. 18 shows the tetrahedronal nose fairing in the deployed position.

FIG. 19 is a side elevation cross-section view through the skin of the tetrahedronal nose fairing taken along the line and in the direction of arrows 19–19 of FIG. 18.

FIGS. 20–21 is a two-part series of drawing views which illustrate a nonsymmetrical deployable, inflatable control structure for aerospace vehicles constructed in accordance with another embodiment of the present invention, wherein: FIG. 20 shows the nonsymmetrical inflatable control structure in a stowed position; and FIG. 21 shows the nonsymmetrical inflatable control structure in a deployed position.

FIG. 22 illustrates another application of the inflatable control structure of the present invention shown mounted to the top of a conventional aircraft wing to provide an adaptive flexible wing which, upon deployment, provides an increase of the chord height of the wing for improved lift characteristics.

FIG. 23 is an enlarged cross-section view of the adaptive flexible wing taken along the line and in the direction of arrows 23–23 of FIG. 22.

FIG. 24 is a side elevation view of a jet engine aircraft equipped with a Forward Looking Infrared (FLIR) sensor and which illustrates how the air flow to the aircraft's engine inlet is changed by the presence of the FLIR sensor.

FIG. 25 is a frontal view of the aircraft of FIG. 24 shown with a deployable inflatable control structure disposed in the engine inlet for providing airflow intake correction

DETAILED DESCRIPTION OF THE PREFERRED EMBODIMENTS

FIG. 1 shows an aircraft 10 that equipped with a thrust vectoring engine 12. FIG. 1 also shows the aircraft 10 with its vertical and horizontal tail stabilizer removed. As noted above, experimental flight tests have demonstrated that aircraft equipped with thrust vectoring engines can be flown without the need for a vertical tail. It is believed that further testing will confirm that horizontal tail stabilizers will likewise become unnecessary in an aircraft equipped with a thrust vectoring engine.

However, as was also previously noted, in the event of failure of the thrust vectoring engine, the aircraft will immediately become uncontrollable. Accordingly, a back up tail stabilizer deployment system is needed.

FIG. 2 shows the aircraft 10 of FIG. 1 shown equipped with deployable aircraft control structures in the form of inflatable vertical and horizontal airfoils or tail stabilizers 14 and 16 constructed in accordance with preferred embodiments of the present invention. The inflatable vertical and horizontal tail stabilizers 14 and 16 are shown in the fully inflated, deployed position and, as such, provide a safety back up system which allows the pilot to regain control of the aircraft 10 in the event of failure of the thrust vectoring engine 12.

As also shown in FIG. 2, the aircraft 10 may be provided with additional inflatable control structures in the form of inflatable wing extensions or wing tips 18 (shown in phantom). The inflatable wing tips 18 are preferably deployed in mid-flight in order to extend the flight range of the aircraft beyond the originally intended mission window. The inflatable wing tips 18 increase the wing span and aspect ratio of the wings with minimal weight penalty. In the event that they are no longer needed, they can be quickly ejected.

The design principles and fabrication details for the inflatable wing tips 18 are substantially the same as for an inflatable airfoils (i.e. the vertical and horizontal tail stabilizers 14 and 16).

The following discussion describes the fabrication steps involved for producing an inflatable airfoil having a complex cross-sectional shape which, by definition, is noncircular or noncylindrical. It is understood that the design principles and fabrication details associated with the construction of an inflatable airfoil are also applicable to a host of other inflatable aircraft control structures which are required to be noncircular or noncylindrical in cross-section.

The first step in the fabrication of an inflatable airfoil involves fabricating a mandrel having a desired airfoil cross-sectional shape.

With reference to FIGS. 5 and 6, the airfoil structure 48 includes a mandrel 50 which is built up about a central axle 52. A pressure bulkhead 54 attached at a first or bottom end of the mandrel 50. The pressure bulkhead 54 preferably includes connecting structure which allows it to be fastened directly to the aircraft 10. Another bulkhead or end cap 55 may be provided at the opposite end. Fastening elements 57 secure the pressure bulkhead 54 and end cap 55 to the center axle 52.

The mandrel 50 is composed of filler material or tooling which can be shaped into a desired airfoil plug mold configuration over which the inflatable airfoil structure is fabricated as a layered construction and then later removed, preferably by a lost wax process. Preferred filler materials or tooling for the mandrel 50 include temperature-sensitive materials which can be melted out from inside the completed airfoil structure 48 by heating to a melting temperature above the cure temperature of the airfoil structure 48 but below a maximum operating temperature for the airfoil structure 48. Exemplary temperature-sensitive filler materials include wax or eutectic metal. Alternatively, the filler material may comprise expanded foam materials, such as styrofoam, which may be dissolved out by an appropriate solvent.

The mandrel 50 includes a plurality of intermediate bulkheads or integral rib members 56 that are shaped as airfoil cross-sections and are arranged, spaced apart, in the cross-wise direction of the mandrel 50.

The number and spacing of the integral rib members 56 will determine the amount of deviation from a perfect airfoil structure that is allowed, since the flexible skin of the inflatable airfoil structure that is attached to the integral rib members 56 (discussed in more detail below) will have a tendency to bulge outwardly at regions between adjacent airfoil-shaped integral rib members 56.

The airfoil-shaped integral rib members 56 advantageously include one or more perforations 58. The perforations 58 serve a dual purpose in that they permit removal of the mandrel filler material during final fabrication and also provide gas passageways to allow inflation gasses to rapidly fill all internal chambers of the inflatable airfoil structure 48.

The flexible skin of the inflatable airfoil structure 48 comprises a composite layer of elastomeric rubber material 60, which is reinforced by plural ply layers of resin-impregnated yarns designated generally by reference numeral 62.

Selection of a suitable elastomeric material entails evaluation of the following characteristics: viscosity, tear strength, shear strength, tensile strength, modulus, cured stiffness and thermal properties. A suitable elastomeric material for the inflatable airfoil is the silicone rubber composition sold by Dow Corning under the trademark SYLGARD® 184 RESIN.

Suitable yarns for use as reinforcement filaments in the ply layers include carbon or graphite filaments, quartz yarns, fiberglass and high modulus organic filaments of aramids and the like. Preferred yarns include the family of high thermal quartz yarns known by the trademark ASTROQUARTZ® available through J. P. Stevens and also the less expensive fiberglass family of yarns. Especially suitable for the inflatable nose fairing is the fiberglass yarn marketed by the Owens Corning Fiberglass Corporation under the trademark S2 GLASS®.

FIGS. 7 and 8 show one embodiment of the invention wherein the integral rib members 56 comprise a sturdy, flexible cloth material, preferably fiber glass, quartz cloth, or KEVLAR (a trademark) cloth. FIGS. 7 and 8 also illustrate the method of attaching the integral rib members 56 to the flexible skin in a seamless fashion. Rib-to-skin attachments 64 are secured to the outboard ends of the integral rib members 56. In this example, the rib-to-skin attachments 64 are also in the form of woven fabric material, which are sewn at one end to the outboard ends of the cloth integral rib members 56. This attachment is preferably performed during the initial fabrication of the mandrel 50.

The composite elastomeric rubber material 60 includes a first base elastomeric layer 60a and a second elastomeric layer 60b. The ply layers 62 shown in FIGS. 5–6 are applied as two distinct ply layers of resin-impregnated yarns 62a, 62b using a resin made from the elastomeric rubber material.

As is best seen in FIG. 7, the base elastomeric layer 60a is applied to those portions of the mandrel 50 which lie between the integral rib members 56 as shown. Next, a first ply layer of resin-impregnated yarns 62a is laid down over the base elastomeric layer 60a. The free or unattached outboard ends of the rib-to-skin attachments 64 are then folded over the base elastomeric layer 60a and first ply layer 62a and are joined together with a bridging piece of cloth 66, preferably by sewn stitches as shown. The second elastomeric layer 60b is then laid over the junction defined by the rib-to-skin attachments 64 and bridging cloth piece 66.

As best shown in FIG. 8, a second ply layer of resin-impregnated yarns 62b are then applied as a series of hoop windings to complete the inflatable airfoil construction.

In order to obtain optimum flexibility and folding capability of the skin in the axial direction of the inflatable airfoil, the orientation of the yarns in the first and second ply layers 62a, 62b are arranged so as to form an unbalanced composite stack whereby the first ply layer 62a consists of axially oriented yarns and the second ply layer 62b consists of hoop wound yarns that are transverse to the axially oriented yarns of the first ply layer 62a. The axially oriented yarns of the first ply layer are concentrated near a neutral axis of the resulting composite structure thereby facilitating bending of the completed inflatable airfoil structure in the axial direction.

The fabrication of the first ply layer 62a is performed in two steps. First, the resin impregnated yarns are hoop wound onto a constant diameter cylinder (not shown). The resulting unidirectional fiber-reinforced elastomeric sheet material is then removed from the constant diameter cylinder and is cut into gore segments sized to fit over the airfoil-shaped mandrel 50 with the yarns of the individual gore segments oriented in the axial direction of the airfoil-shaped mandrel 50. The second ply layer 62b is then applied by steep helical winding of resin-impregnated yarns in a circumferential fashion about the airfoil-shaped mandrel 50. The second ply layer 62b is preferably deposited to provide a 2:1 thickness ratio with the first ply layer to provide adequate burst resistance.

For a more in depth discussion of the above described unbalanced ply lay up construction technique, reference is made to copending application Ser. Nos. 08/249,847 and 08/250,042, both of which are incorporated by reference in this application.

Alternatively, resin-impregnated cloth material could be used for the first ply layer 62a in place of the specially formed cut gores of resin-impregnated unidirectional fiber-reinforced elastomeric sheet material.

FIGS. 9 and 10 show an alternate embodiment of the invention. In the following discussion, all structural elements common to the preferred and alternate embodiments share identical reference numerals, while all structural elements in the alternate embodiment which differ from corresponding structural elements in the preferred embodiment are indicated by primed reference numerals. In the alternate embodiment of FIGS. 9–10, the integral rib members 56' comprise rigid airfoil cross-sectional shapes and may be formed from metallic, composite or like rigid, lightweight materials. The rib-to-skin cloth attachments 64 are secured to the outboard ends of the metallic integral rib members 56' by a suitable adhesive.

Once the airfoil structure 48 has been fabricated with all the various elastomeric rubber layers, resin-impregnated ply layers and rib-to-skin cloth attachments in place, the completed structure is ready to be cured. With reference to FIG. 11, the completed airfoil structure 48, is wrapped within a blanket 70 and then bagged within a vacuum bag 72 in accordance with conventional composite curing techniques. The blanket 70 absorbs any excess rubber or resins which run off of the resin-impregnated ply layers.

Next, as shown in FIG. 12, the bagged structure is placed in an oven 74 and cured at a temperature and time duration sufficient to ensure that the base and first elastomeric layers 60a, 60b flow together and impregnate the weave openings in the intermediate portions of the rib-to-skin attachments 64 and bridging cloth 66 to provide a seamless pressure membrane. The cured airfoil structure 48 is then removed from the oven 74, the vacuum bag 72 and blanket 70 are removed and the center axle 51 is withdrawn from the mandrel 50 (see FIG. 13).

FIGS. 14–16 illustrate how the filler material or tooling of the mandrel 50 is removed by a lost wax process. In this example, the filler material or tooling comprises a heat-sensitive material such as wax or eutectic metal having a melting point which lies above the cure temperature of the composite airfoil structure 48. As shown in FIG. 14, the airfoil structure 48 is placed back inside the oven 74 and heated to a temperature above the previous cure temperature but below the maximum operating temperature of the airfoil structure 48 until all the tooling melts out through the co-aligned axial holes in the internal rib members left by the removal of the center axle 51 and also through other perforations that are provided to the integral rib members (see FIG. 15). Once the tooling is completely removed from the airfoil structure 48, the airfoil structure 48 is collapsed down into a stowed position (FIG. 16).

FIGS. 17–18 show a tetrahedronal missile nose fairing 80 constructed in accordance with another embodiment of the present invention. The tetrahedronal nose fairing 80 incorporates a plurality of rigid trapezoidal shaped panels which when arranged as shown define fold regions and also serve to define the tetrahedronal shape. In FIG. 17, the tetrahedronal nose fairing 80 is shown in the folded, stowed position. In FIG. 18, the tetrahedronal nose fairing 80 is shown inflated into the fully deployed position.

FIG. 19, shows the detail of the composite lay up for the tetrahedronal nose fairing embodiment. The ordered sequence of the base and second elastomeric layers 60a, 60b, the axial and hoop wound ply layers 62a, 62b and rib-to-skin attachments 64 is substantially the same as before except that the first ply layer is removed in favor of rigid panels that are interposed between the second elastomeric layer 60b and the outer hoop wound ply layer 62b. A preferred material for use as the rigid panel layer is metal sheet material.

Many applications of inflatable control structures for aircraft which incorporate rigid panels are possible. FIGS. 20–21, show one specific example of an inflatable control structure 90 which incorporates rigid panels in the form of a flat bottom conical structure in both the stowed position (FIG. 20) and the deployed position (FIG. 21). The number of rigid panels that are used will determine the number of fold lines that are present in the completed structure. For the construction details for the flat bottom portion, the reader is referred to FIG. 19. Similarly, the construction details for the upper curved hemispherical portion are described above with reference to FIG. 8.

Inflatable control structures produced by the fabrication method of the present invention may also be incorporated with the existing structure of conventional aircraft to provide added performance and/or control during mid-flight.

As a first example, with reference to FIG. 22, an inflatable control structure 92 may be attached to the upper surface of a conventional wing structure 94 to provide an adaptive flexible wing, whereby deployment of the inflatable structure 92 increases the chord height of the adaptive flexible wing by a desired amount for improved lift and cruise performance.

Ideal applications for adaptive flexible wings as disclosed herein include all aircraft which are required to land on, and take off from, short runways, e.g. navy aircraft. In accordance with the conventional practice, the wings of navy aircraft are provided with leading edge slats and trail edge flaps to provide the necessary high lift control characteristics for aircraft carrier take offs and landings. The gaps which invariably surround the slats and flaps of such navy aircraft wings result in an undesirably large radar cross-section signature, even when they are in the stowed position. The provision of an inflatable control structure 92 along the upper wing surface eliminates the need for such slats and flaps and therefore reduces the radar cross-section signature of the aircraft.

Previous known attempts for producing an adaptive flexible wing have used "smart" materials (e.g. piezoelectric polymers) along the upper wing surface. In theory, excitation of the smart material would cause it to increase in thickness and therefore increase the chord height of the wing. In practice, it has been found difficult to be able to achieve anything more than about a 0.002 inch thickness increase of such smart materials. For navy aircraft carrier based applications, a minimum two inch rise is needed. A two inch rise is easily obtained using an inflatable control structure which is fabricated in accordance with the present invention.

As best seen in FIG. 23, the integral rib members 56 used in the inflatable structure 92 of the adaptive flexible wing embodiment preferably comprise cloth material or some similar flexible material which enables the inflatable structure 92 to be collapsed down for compact stowage of the inflatable control structure 92 against the upper surface of the wing 94.

As before, the rib-to-skin attachments 64 comprise cloth material and are attached, preferably by stitches, to the outboard ends of the integral rib member 56. Rigid angle members 93, preferably fashioned from a light-metal material, are positioned over the rib-to-skin attachments 64 as shown, and are riveted to the wing 94 by self-sealing rivets 95 to secure the cloth integral rib members 56 to the wing 94. This connection is sealed by the two elastomeric layers, 60a and 60b which, during cure, flow together at their adjoining ends to form a seamless airtight seal.

FIGS. 24-25 illustrate another example of how inflatable control structures fabricated in accordance with the present invention may be incorporated with the existing structure of conventional aircraft for added performance. FIG. 24 shows a conventional aircraft 96 that is equipped with a sensor, such as a Forward Looking Infrared (FLIR) sensor unit mounted under the nose tip. The FLIR sensor unit, being located just forwardly of the air inlet 97 to the engine introduces air turbulence which, under certain operating conditions, can adversely effect the engine performance.

A common approach for controlling air flow through an engine air intake would be to employ a movable metal cone within the engine inlet to vary the air intake to the engine to correct for the turbulence introduced by the FLIR unit. However, such movable cones present an undesirable weight penalty and also have a large radar cross-section signature.

As is best seen in FIG. 25, a light weight and radar transparent inflatable control structure 98 could be easily attached to an inner wall surface of the engine's air intake chamber and could be deployed to alter the airflow to the engine 97 in a manner which avoids the aforementioned flame out condition.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. An inflatable, deployable control structure for aerospace vehicles which is deployable from a folded, compactly stowed position to an aerodynamic shape, deployed position, and wherein said control structure assumes a desired noncircular or noncylindrical airfoil shaped cross-sectional configuration when in said deployed position, the control structure comprising:

a) a primary structure comprising a filament-reinforced flexible membrane and including pressure bulkhead means for removably attaching the control structure to corresponding receiving structure of aerospace vehicles, said primary structure is deployable from a concentrically folded stowed position to an aerodynamic shape deployed position;

b) airfoil shaped integral rib means disposed enclosed within said filament-reinforced flexible membrane and spaced at predetermined intervals along an axial direction of said primary structure, said integral rib means for defining a particular airfoil shaped cross-sectional configuration of the control structure; and c) rib-to-skin attachment means for attaching said integral rib means to said filament-reinforced flexible membrane in a seamless airtight manner.

2. The apparatus according to claim 1, wherein:

a) said primary structure further comprises:

i) a base layer of elastomeric rubber material disposed between adjacent ones of said integral rib means;

ii) a first ply layer of resin impregnated yarns overlying said base layer of elastomeric rubber material, said first ply layer having filaments arranged in a single direction and oriented substantially along the axial direction of said the primary structure;

iii) a second layer of elastomeric rubber material overlying said first ply layer;

iv) a second ply layer of hoop wound resin impregnated yarns overlying said second layer of elastomeric rubber material, said second ply layer having filaments arranged substantially transverse to the filaments of said first ply layer; and b) said rib-to-skin attachment means comprise a plurality of flexible cloth attachment members, each of which having a first end attached to a respective one of said integral rib means and a second end disposed cured in place between said first ply layer and said second layer of elastomeric rubber material such that said base and second layers of elastomeric rubber material flow together and through porous openings of said cloth attachment members to form a continuous gaseous pressure membrane.

3. The apparatus according to claim 2, wherein said integral rib means include perforations to facilitate rapid gas pressurization of all chambers of the control structure upon inflation into the deployed position.

4. The invention defined in claim 3, wherein said integral rib means comprise flexible cloth material.

5. The invention defined in claim 3, wherein said integral rib means comprise rigid material.

6. The apparatus according to claim 2, wherein said primary structure further includes at least one rigid panel member disposed between said second layer of elastomeric rubber material and said second ply layer, said at least one rigid panel member defining a flat surface of the control structure.

7. The apparatus according to claim 1, wherein:
a) said primary structure further comprises:
   i) a base layer of elastomeric rubber material disposed between adjacent ones of said integral rib means;
   ii) a first ply layer of resin impregnated woven cloth material overlying said base layer of elastomeric rubber material;
   iii) a second layer of elastomeric rubber material overlying said first ply layer;
   iv) a second ply layer of hoop wound resin impregnated yarns overlying said second layer of elastomeric rubber material, said second ply layer having filaments arranged substantially transverse to the axial direction of the control structure; and
b) said rib-to-skin attachment means comprise a plurality of flexible cloth attachment members, each of which having a first end attached to a respective one of said integral rib means and a second end disposed cured in place between said first ply layer and said second layer of elastomeric rubber material such that said base and second layers of elastomeric rubber material flow together and through porous openings of said cloth attachment members to form a continuous gaseous pressure membrane.

8. The apparatus according to claim 7, wherein said the integral rib means include perforations to facilitate rapid gas pressurization of all chambers of the control structure upon inflation into the deployed position.

9. The invention defined in claim 8, wherein said integral rib means comprise flexible cloth material.

10. The invention defined in claim 8, wherein said integral rib means comprise rigid material.

11. The apparatus according to claim 7, wherein said primary structure further includes at least one rigid panel member disposed between said second layer of elastomeric rubber material and said second ply layer, said at least one rigid panel member defining a flat surface of the control structure.

12. An inflatable, deployable control structure for aerospace vehicles which is deployable from a folded, compactly stowed position to an aerodynamic shape, deployed position, and wherein said control structure assumes a desired noncircular or noncylindrical airfoil shaped cross-sectional configuration when in said deployed position, the control structure comprising:
a) a primary structure comprising a filament-reinforced flexible membrane and including pressure bulkhead means for removably attaching the control structure to corresponding receiving structure of aerospace vehicles, said primary structure is deployable from a concentrically folded stowed position to an aerodynamic shape deployed position;
b) plurality airfoil shaped integral rib members disposed enclosed within said filament-reinforced flexible membrane and spaced at predetermined intervals along an axial direction of said primary structure, said integral rib members defining a particular airfoil shaped cross-sectional configuration of the control structure; and
c) a plurality of rib-to-skin attachments for attaching said integral rib means to said filament-reinforced flexible membrane in a seamless airtight manner.

13. The apparatus according to claim 12, wherein:
a) said primary structure further comprises:
   i) a base layer of elastomeric rubber material disposed between adjacent ones of said integral rib means;
   ii) a first ply layer of resin impregnated yarns overlying said base layer of elastomeric rubber material, said first ply layer having filaments arranged in a single direction and oriented substantially along the axial direction of said the primary structure;
   iii) a second layer of elastomeric rubber material overlying said first ply layer;
   iv) a second ply layer of hoop wound resin impregnated yarns overlying said second layer of elastomeric rubber material, said second ply layer having filaments arranged substantially transverse to the filaments of said first ply layer; and
b) said rib-to-skin attachments comprise flexible cloth attachment members, each of which having a first end attached to a respective one of said integral rib members and a second end disposed cured in place between said first ply layer and said second layer of elastomeric rubber material such that said base and second layers of elastomeric rubber material flow together and through porous openings of said cloth attachment members to form a continuous gaseous pressure membrane.

14. The apparatus according to claim 13, wherein said integral rib members include perforations to facilitate rapid gas pressurization of all chambers of the control structure upon inflation into the deployed position.

15. The invention defined in claim 14, wherein said integral rib members comprise flexible cloth material.

16. The invention defined in claim 14, wherein said integral rib members comprise rigid material.

17. The apparatus according to claim 13, wherein said primary structure further includes at least one rigid panel member disposed between said second layer of elastomeric rubber material and said second ply layer, said at least one rigid panel member defining a flat surface of the control structure.

18. The apparatus according to claim 12, wherein:
a) said primary structure further comprises:
   i) a base layer of elastomeric rubber material disposed between adjacent ones of said integral rib members;
   ii) a first ply layer of resin impregnated woven cloth material overlying said base layer of elastomeric rubber material;
   iii) a second layer of elastomeric rubber material overlying said first ply layer;
   iv) a second ply layer of hoop wound resin impregnated yarns overlying said second layer of elastomeric rubber material, said second ply layer having filaments arranged substantially transverse to the axial direction of the control structure; and
b) said rib-to-skin attachments comprise flexible cloth attachment members, each of which having a first end attached to a respective one of said integral rib members and a second end disposed cured in place between said first ply layer and said second layer of elastomeric rubber material such that said base and second layers of elastomeric rubber material flow together and through porous openings of said cloth attachment members to form a continuous gaseous pressure membrane.

19. The apparatus according to claim 18, wherein said integral rib members include perforations to facilitate rapid gas pressurization of all chambers of the control structure upon inflation into the deployed position.

20. The invention defined in claim 19, wherein said integral rib members comprise flexible cloth material.

21. The invention defined in claim 19, wherein said integral rib members comprise rigid material.

22. The apparatus according to claim 18, wherein said primary structure further includes at least one rigid panel member disposed between said second layer of elastomeric rubber material and said second ply layer, said at least one rigid panel member defining a flat surface of the control structure.

* * * * *